United States Patent
Keir et al.

(10) Patent No.: US 9,272,453 B1
(45) Date of Patent: Mar. 1, 2016

(54) HOT RUNNER WITH REMOVABLE GATE PAD

(71) Applicant: Husky Injection Molding Systems Ltd., Bolton (CA)

(72) Inventors: William Steven Keir, Aurora (CA); Hakimuddin Boxwala, Brampton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 14/472,687

(22) Filed: Aug. 29, 2014

(51) Int. Cl.
*B29C 45/23* (2006.01)
*B29C 45/27* (2006.01)

(52) U.S. Cl.
CPC ......... *B29C 45/2711* (2013.01); *B29C 45/2737* (2013.01)

(58) Field of Classification Search
CPC ................. B29C 45/2711; B29C 45/2737
USPC .................................. 425/549, 572
See application file for complete search history.

(56) References Cited

U.S. PATENT DOCUMENTS

| | | | |
|---|---|---|---|
| 3,535,742 A | 10/1970 | Marcus | |
| 5,879,727 A * | 3/1999 | Puri | 425/549 |
| 6,214,275 B1 * | 4/2001 | Catoen et al. | 264/328.9 |
| 6,305,923 B1 | 10/2001 | Godwin et al. | |
| 6,341,954 B1 | 1/2002 | Godwin et al. | |
| 6,575,729 B2 | 6/2003 | Godwin et al. | |
| RE38,480 E * | 3/2004 | Catoen et al. | 264/328.9 |
| 6,764,297 B2 | 7/2004 | Godwin et al. | |
| 7,025,585 B2 | 4/2006 | Gellert | |
| 7,029,260 B2 | 4/2006 | Godwin et al. | |
| 7,071,449 B2 | 7/2006 | Godwin et al. | |
| 7,458,795 B2 | 12/2008 | Seres et al. | |
| 7,566,216 B2 | 7/2009 | Kmoch et al. | |
| 7,568,906 B2 | 8/2009 | Kmoch et al. | |
| 7,704,069 B2 | 4/2010 | Chen et al. | |
| 7,771,189 B2 | 8/2010 | Chen | |
| 7,780,433 B2 * | 8/2010 | Fischer et al. | 425/549 |
| 2011/0198770 A1 * | 8/2011 | Brown et al. | 264/40.5 |

FOREIGN PATENT DOCUMENTS

JP  2012135940  11/2013

OTHER PUBLICATIONS

US 8,575,157, 07/2013, Chen (withdrawn).

* cited by examiner

Primary Examiner — Tim Heitbrink

(57) ABSTRACT

An injection molding machine comprises a manifold plate, a nozzle extending through the manifold plate, and a gate pad. A valve stem is disposed within the nozzle and is movable between a first position in which the valve stem extends through an outlet of the nozzle, and a retracted position. The gate pad has an inlet end with an inlet opening and an outlet end with a gate aperture. The inlet end is removably attachable to the manifold plate so that the nozzle is received through the inlet opening and the outlet of the nozzle is in communication with the gate aperture, wherein the valve stem seals the gate aperture in the extended position. The outlet end of the gate pad abuts a mold insert and molding material is delivered from the nozzle to a cavity defined by the mold insert through the gate aperture.

18 Claims, 8 Drawing Sheets

HOT RUNNER WITH REMOVABLE GATE PAD

FIELD

This application relates to hot runner assemblies for injection molding machines and to pads for locating a hot runner nozzle tip relative to a mold.

BACKGROUND

Injection molding is a process by which a molding material is injected into a mold and then cooled to form a solid molded article. A molding material, such as, for example, polyethylene terephthalate (PET) is placed in a plasticizing unit, which heats the molding material into a molten, flowable state. Molten molding material is then conveyed through a distribution network, often referred to as a "hot runner", and delivered to a mold through a nozzle.

Flow of molding material out of the nozzle is controlled at a gate. A valve stem in the nozzle may be extended to seal the gate and retracted to open the gate. Unfortunately, typical designs are prone to wear due to misalignment and are difficult to service or replace.

SUMMARY

An example hot runner assembly for delivering molding material to a mold cavity of an injection molding machine through a mold inlet comprises: a manifold plate; a nozzle extending through the manifold plate, the nozzle having a nozzle outlet; a gate pad having an inlet end with an inlet opening and an outlet end with a gate aperture and a passage through said gate pad from the inlet opening to the gate aperture, the gate pad removably attached to the manifold plate so that the nozzle is received in the passage and the nozzle outlet is in communication with the mold inlet through the gate aperture; a valve stem within the nozzle, movable between an extended position, in which the valve stem seals the gate aperture to prevent flow of molding material therethrough, and a retracted position.

An example gate pad for an injection molding machine comprising a manifold plate, a nozzle extending through the manifold plate and a valve stem within the nozzle movable between an extended position in which the valve stem extends through an outlet of the nozzle and a retracted position, comprises: a body having an inlet end with an inlet opening and an outlet end with a gate aperture, and a passage through the body from the inlet opening to the gate aperture; the inlet end removably attachable to the manifold plate so that the nozzle is received in the passage through the inlet opening and the outlet of the nozzle is in communication with the gate aperture, wherein the valve stem seals the gate aperture in the extended position.

An example method of disassembling an injection molding machine comprising a mold and a hot runner having a manifold plate comprises: extending a valve stem within a nozzle of the hot runner to form a seal with a gate aperture in a gate pad attached to the manifold plate, thereby preventing flow of molding material through the gate aperture; removing the mold from the hot runner with the seal intact.

BRIEF DESCRIPTION OF THE DRAWINGS

In the figures, which illustrate by way of example only, embodiments of this invention.

DETAILED DESCRIPTION

Figure 1:
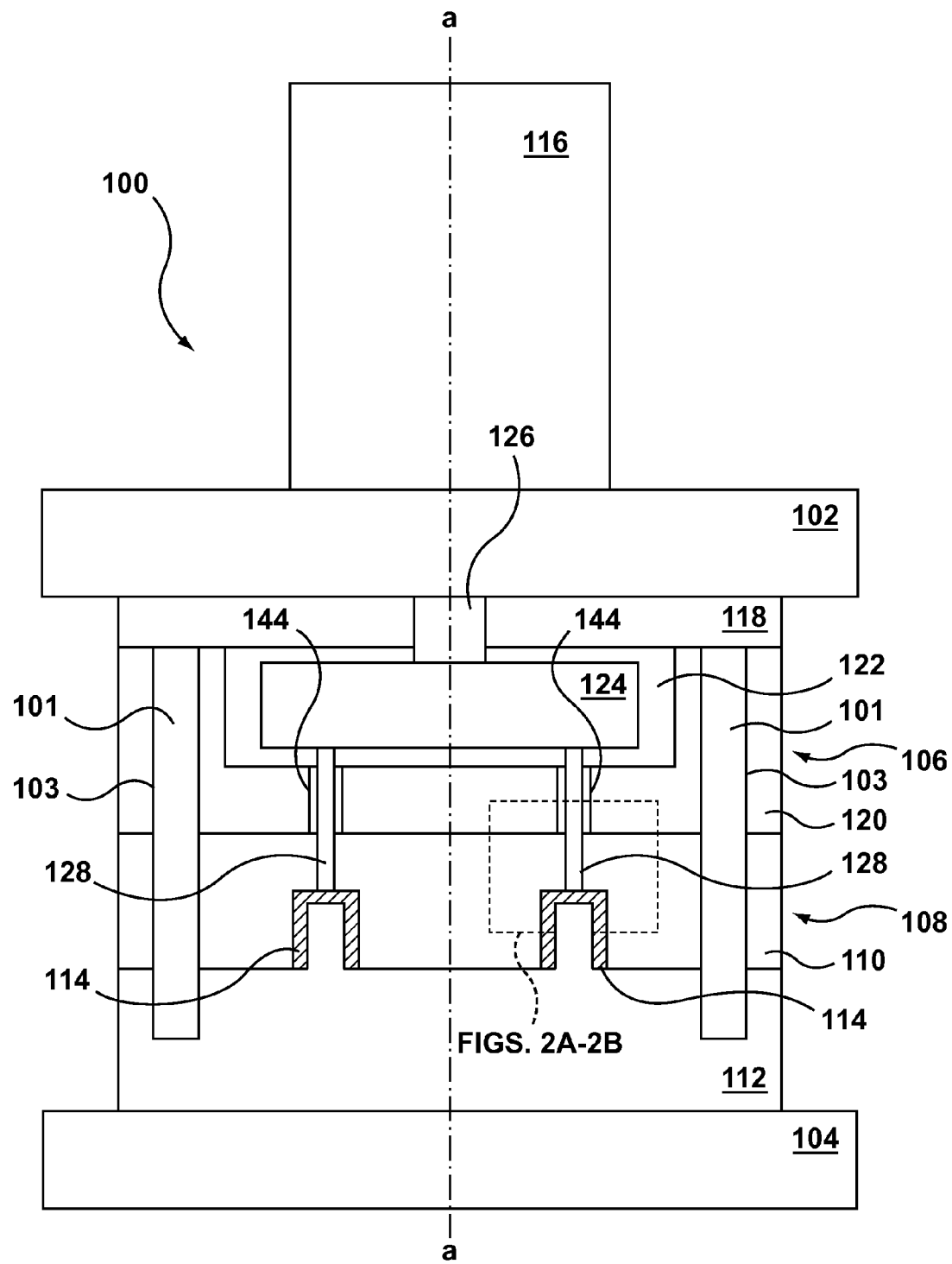
FIG. 1 is a top schematic view of an injection molding machine.

FIG. 1 depicts an example embodiment of an injection molding machine 100 for forming molded articles from molding material. Molding machine 100 has a stationary platen 102 and a movable platen 104. A hot runner 106 and mold 108 are mounted between platens 102, 104. Hot runner 106 is mounted to stationary platen 102. Mold 108 comprises a mold cavity plate 110 mounted to hot runner 106, and a mold core plate 112 mounted to moveable platen 104.

Moveable platen 104 is movable between a closed position, depicted in FIG. 1, and an open position (not shown) in which movable platen 104 is withdrawn away from stationary platen 102 along axis a-a (hereinafter referred to as the longitudinal axis).

With moveable platen 104 in the closed position, mold cavity plate 110 and core plate 112 abut one another and may be pressed together by a force exerted on the platens.

In the closed position, a plurality of mold cavities 114 are defined between cavity plate 110 and core plate 112. Molten molding material may be injected under pressure into mold cavities 114 and cooled to form molded parts. Two such cavities are depicted in FIG. 1, but mold 108 may have any number of cavities.

Cavities 114 receive molten molding material from a plasticizing unit 116 through hot runner 106. Plasticizing unit heats molding material to a desired temperature sufficient to render the molding material in a flowable state. Plasticizing unit 116 may, for example, compress solid pellets of molding material with a screw or augur, heating the material and urging it toward cavities 114. Other suitable plasticizing units are well known to those skilled in the art.

Hot runner 106 comprises a backing plate 118 mounted to stationary platen 102. A sprue bushing 126 is received through the backing plate and coupled to a manifold 124, for example using bolts or the like. Sprue bushing 126 has an inner passage for receiving molten molding material from plasticizing unit 116.

A manifold plate 120 is mounted to backing plate 118, for example, using bolts or other suitable fasteners. A manifold pocket 122 is defined between manifold plate 120 and backing plate 118. Manifold 124 is disposed within manifold pocket 122. Manifold 124 is attached to backing plate 118 and manifold plate 120 using alignment pins (not shown). The alignment pins may align manifold 124 to backing plate 118 but may allow manifold 124 to float in the longitudinal direction of injection molding machine 100. Thermally-insulating spacers (not shown) may be provided between manifold 124 and backing plate 118, manifold plate 120.

Manifold 124 has an inlet in fluid communication with sprue bushing 126 to receive molding material. The inlet branches into a plurality of conduits (not shown) that run internally within manifold 124 from sprue bushing 126 to each of a plurality of nozzles 128, to deliver molding material thereto. Nozzles 128 may form part of larger assemblies, which may for example include one or more heaters (not shown) or seals (not shown).

Nozzles 128 are mounted to manifold 124, by conventional methods, well-known to those skilled in the art. Nozzles 128 may, for example, be mounted using preloaded spring packs and aligning features such as pins. Each nozzle 128 extends through a passage 144 in manifold plate 120 to a corresponding cavity 114 to supply molding material thereto. Two nozzles 128 are depicted in FIG. 1, however any number may be present.

Each of manifold plate 120, cavity plate 110 and core plate 112 have alignment bores 103 extending longitudinally therethrough. Alignment pins 101 are mounted to backing plate 118, for example, using bolts or other suitable fasteners (not shown). Alignment pins 101 extend through alignment bores 103 to maintain relative alignment between backing plate 118, manifold plate 120, cavity plate 110 and core plate 112.

Figure 2A:
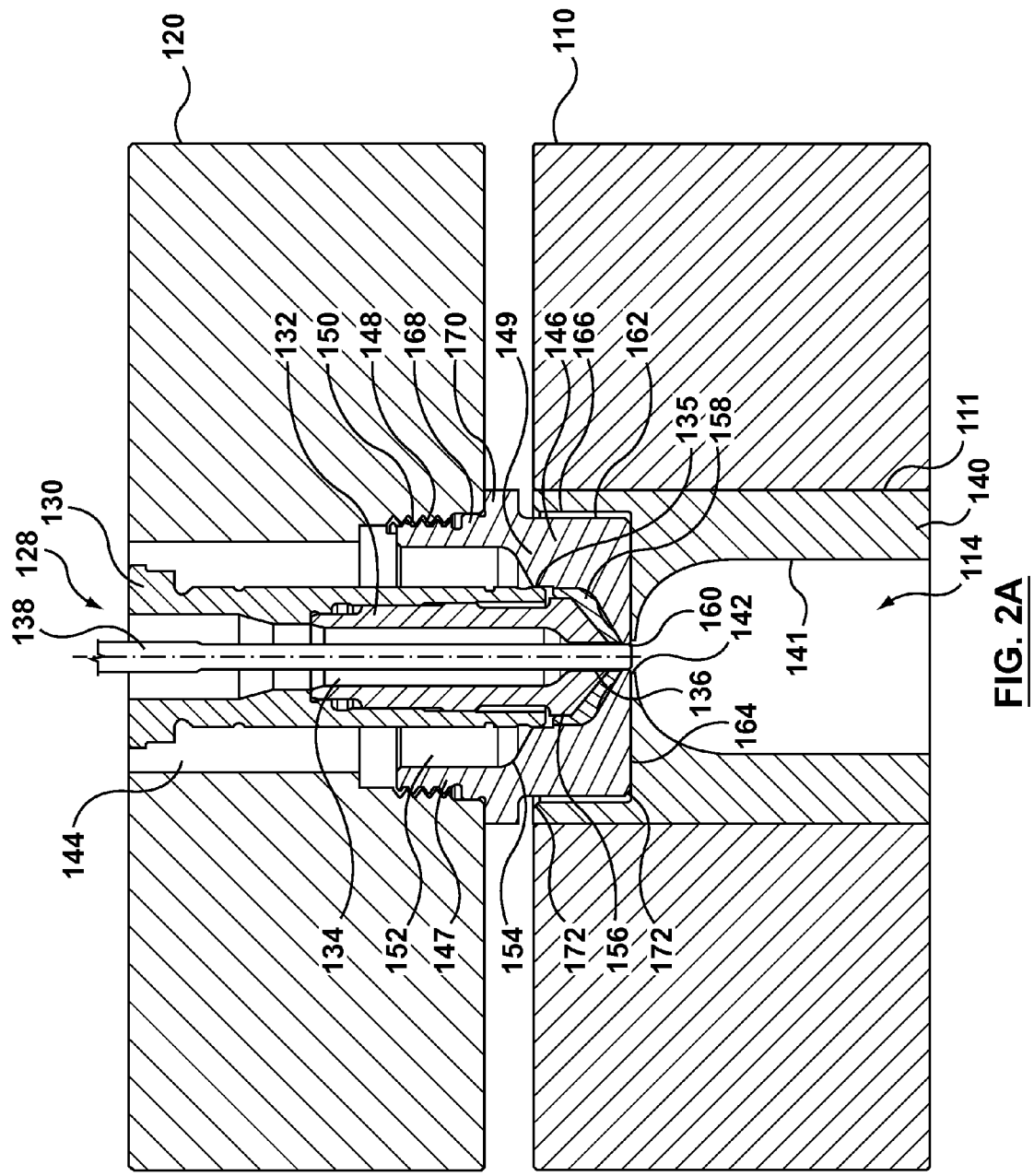
FIG. 2A is an enlarged cross-sectional view of a sub-assembly of the injection molding machine of FIG. 1 in a first operational state.
Figure 2B:
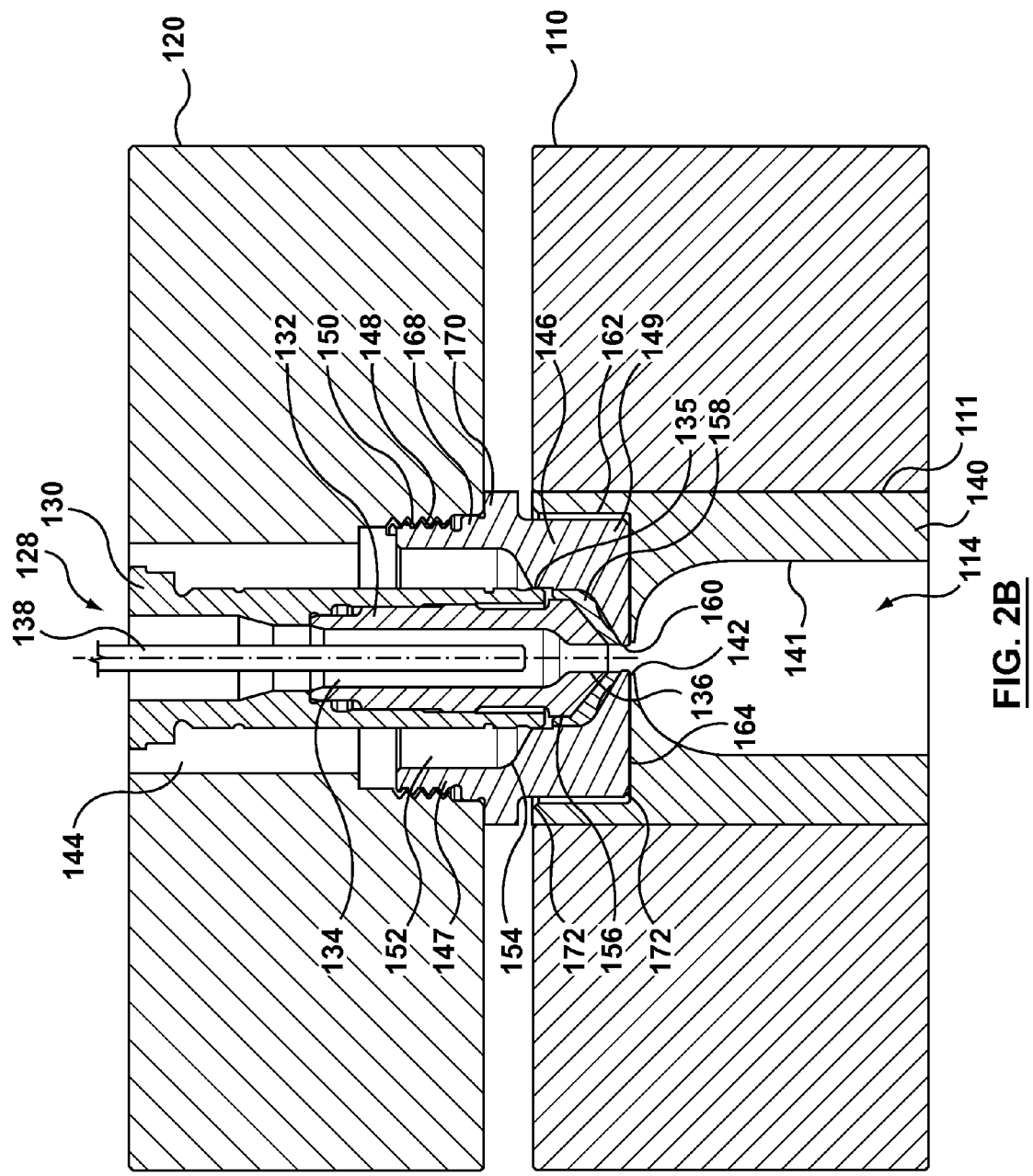
FIG. 2B is an enlarged cross-sectional view of the sub-assembly of FIG. 2A in a second operational state.

FIGS. 2A-2B depict an example nozzle 128 in greater detail. As illustrated, nozzle 128 includes a housing 130 and a tip 132 threaded into housing 130. Housing 130 and tip 132 define a continuous sealed internal passage 134 leading to a nozzle outlet 136. Nozzle tip 132 tapers towards the end of nozzle 128. A thermal insulating member 158 is disposed at the outlet end of nozzle tip 132 when assembled. Thermal insulating member 158 has an aperture therethrough corresponding to nozzle outlet 136.

A valve stem 138 is received in internal passage 134. Valve stem 138 is movable between an extended position, as depicted in FIG. 2A, and a retracted position, depicted in FIG. 2B. Valve stem 138 is movable by an actuator (not shown), housed in backing plate 118. The actuator may, for example, be a linear actuator, such as a pneumatic, hydraulic or electric actuator. In its extended position, valve stem 138 extends through nozzle outlet 136. In its retracted position, valve stem 138 is withdrawn within internal passage 134 and is clear of nozzle outlet 136. The width of valve stem 138 is slightly less than that of nozzle outlet 136 so that, in its extended position, valve stem 138 substantially blocks nozzle outlet 136, but need not contact nozzle outlet 136 or form a positive seal therewith. In an example embodiment, there may be approximately 200 microns of clearance between valve stem 138 and nozzle outlet 136.

Nozzle 128 is mounted to manifold 124 and is received in passage 144 of manifold plate 120 without contacting manifold plate 120.

A gate pad insert 146 is removably attached to manifold plate 120 and fits over nozzle 128 to maintain alignment of nozzle 128 relative to manifold plate 120. In some embodiments, gate pad insert 146 has a generally cylindrical body, with an inlet end 147 and an outlet end 149.

Inlet end 147 has external threads 148 which matingly engage threads 150 in manifold plate 120 proximate the end of passage 144. Inlet end 147 thus serves as a retention element to removably attach gate pad insert 146 to manifold plate 120.

Gate pad insert 146 includes external shoulder 168 and flange 170, which protrude outwardly. Shoulder 168, which may be annular, is received in a corresponding pocket defined in manifold plate 120 at the end of passage 144. Shoulder 168 bears tightly against manifold plate 120 and maintains alignment of gate pad insert 146 relative to manifold plate 120.

Flange 170 abuts the face of manifold plate 120 and maintains the correct longitudinal position of gate pad insert 146 relative to manifold plate 120. That is, flange 170 limits the distance gate pad insert 146 can be threaded into manifold plate 120.

Gate pad insert 146 has an internal passage 152 therethrough. Passage 152 tapers longitudinally from a wide inlet at its upstream end to a narrow gate aperture 160 at its downstream end. As used herein, the terms "upstream" and "downstream" refer to the direction of flow of molding material. That is, "downstream" is the direction toward cavities 114, and "upstream" is the direction toward plasticizing unit 116.

Nozzle 128 is received in passage 152 of gate pad insert 146. Passage 152 may include a shoulder 154. Upstream of shoulder 154, the width of passage 152 is much greater than that of nozzle 128 to permit a heater, such as a coil heater to be installed around nozzle 128, and to maintain an air gap between nozzle 128 and gate pad 146. Downstream of shoulder 154, passage 152 is dimensioned to tightly fit nozzle 128. Gate pad 146 forms a seal 135 with nozzle housing 130 downstream of shoulder 154.

Proximate gate aperture 160, passage 152 may have a tapered shape approximately complementary to that of nozzle tip 132. Thus, the end of nozzle tip 132 is tightly received in passage 152 so that nozzle outlet 136 and valve stem 138 align with gate aperture 160. A thermal insulating member 158 may be compressed between nozzle tip 132 and gate pad insert 146, so that thermal insulating member 158 abuts the wall of passage 152. Thermal insulating member 158 may be formed, for example, from high-temperature resistant plastic and may form a thermal barrier between nozzle 128 and gate pad 146.

Gate aperture 160 is sized correspondingly to valve stem 138 so that, in its extended position valve stem 138 is received in gate aperture 160 and forms a seal therewith (FIG. 2A). Conversely, in its retracted position, valve stem 138 is clear of gate aperture 160 (FIG. 2B).

The tapered shapes of nozzle tip 132 and passage 152 may cooperate to guide nozzle 128 into the correct position in gate pad insert 146 as gate pad insert 146 is attached to manifold plate 120 by advancing inlet end 147 into passage 144.

Nozzle 128 is aligned with a mold cavity 114 to supply molding material thereto. Mold cavity 114 may be defined by a mold cavity insert 140 received in cavity plate 110, and a mold core insert (not shown) received in core plate 112 (FIG. 1). Mold cavity insert 140 and the mold core insert define the outer and inner surfaces, respectively, of a part molded in cavity 114. Specifically, mold cavity insert 140 has a molding surface 141 which defines the outer surface of molded parts. Mold cavity insert 140 has an inlet 142 (FIG. 2B) through which molding material may be introduced into mold cavity 114.

Mold cavity insert 140 defines a recess 166 for receiving outlet end 149 of gate pad insert 146. Outlet end 149 is generally cylindrical and has a lateral surface 162 and flat end surface 164. Flat end surface 164 tightly abuts and forms a seal with cavity insert 140. Recess 166 may be sized to provide some clearance between recess 166 and lateral surface 162. Clearance between recess 166 and lateral surface 162 allows for tolerance of some misalignment between gate pad insert 146 and cavity insert 140 without gate pad insert 146 rubbing against cavity insert 140. In some embodiments, clearance between lateral surface 162 of outlet end 149 and recess 166 may be within approximately 0.5 mm to 1.0 mm.

One or both of cavity insert 140 and outlet end 149 of gate pad insert 146 may have chamfered corners 172. Chamfered corners may help guide outlet end 149 into recess 166.

Inlet 142 of mold cavity insert 140 is aligned with gate aperture 160 of gate pad insert 146, and thus, with nozzle outlet 136 and valve stem 138. Inlet 142 is slightly larger than gate aperture 160, so that, within the alignment tolerance permitted by outlet end 149 and recess 166, gate aperture 160 and inlet 142 are always in communication. That is, inlet 142 is sized so that, at the maximum misalignment condition, gate aperture 160 and inlet 142 remain in flow communication. Likewise, inlet 142 is sized so that valve stem 138 does not contact mold cavity insert 140. That is, at the maximum misalignment condition, valve stem 138 can be moved to its extended position without contacting mold cavity insert 140. In an example, the radius of inlet 142 may be larger than that of gate aperture 160 by approximately the same amount as or more than recess 166 is wider than outlet end 149 of gate pad insert 146. That is, if recess 166 is sized to provide 0.5 mm of clearance on each side of outlet end 149, the radius of inlet aperture 142 may be approximately 0.5 mm greater than that of gate outlet 160, or more.

As best shown in FIG. 2A, in its extended position, valve stem 138 extends through nozzle outlet 136, seal member 158, gate aperture 160 and inlet 142. Gate aperture 160 is dimensioned to form a seal with valve stem 138 in the extended position of valve stem 138, preventing molding material from flowing out of nozzle 128. Backflow of molding material out of cavity 114 may be prevented by the seal formed between flat end surface 164 against cavity insert 140 and by the seal between valve stem 138 and gate aperture 160.

Conversely, with valve stem 138 in its retracted position, as shown in FIG. 2B, molding material is free to flow out of nozzle 128, through nozzle outlet gate aperture 160 and inlet 142 and into cavity 114.

The components of hot runner 106 and mold 108, including gate pad 146, cavity insert 140 and nozzle 128, may be formed from metal. For example, the components may be formed from stainless steel, such as 420 stainless steel. Other metals may be used in other embodiments. As will be appreciated, the components of injection molding machine 100 may be subjected to significant mechanical and thermal loads during operation and may be subjected to frictional wear due to movement of components. Accordingly, suitable materials are those which have sufficient strength and surface hardness. All components may be formed from identical materials, such as identical stainless steel alloys, or different components may be formed from different materials. For example, gate pad insert may be formed from a metal selected for relatively low thermal conductivity, such as titanium, and the cavity insert 140, or a part thereof, may be formed from a metal selected for high thermal conductivity, such as beryllium copper. Alternatively, gate pad 146 and cavity insert 140 may be formed of a combination of metals having different thermal conductivities. Alternatively or additionally, components may be selected to have differing hardness so that certain components wear more than others. For example, gate pad insert 146 may be formed of a softer metal than valve stem 138 so that gate aperture 160 tends to wear, rather than valve stem 138, as the two rub together. The wear surfaces of gate pad 146 and valve stem 138 could be coated with wear-resistant coatings, such as diamond-chrome, chrome, nickel-cobalt or cobalt, or other suitable coatings well known to those skilled in the art.

In use, injection molding machine 100 is operated in molding cycles. At the beginning of a molding cycle, moveable platen 104 is in its closed position as depicted in FIG. 1 and force is exerted on the platens 102, 104 to urge mold cavity plate 110 and mold core plate 112 together. At least some of this force may be borne by gate pad insert 146, urging flat end surface 164 against mold cavity insert 140, which may thereby form a seal between flat end surface 164 and mold cavity insert 140. Valve stem 138 is withdrawn to its retracted position, shown in FIG. 2B, and molding material is injected under pressure through nozzle 128 and into cavity 114. Molding material travels through nozzle outlet 136, gate aperture 160 and inlet 142.

After injection is completed, valve stem 138 is moved to its extended position, as shown in FIG. 2A. Valve stem 138 forms a seal with gate aperture 160 and seal member 158, stopping the flow of molding material out of nozzle 128. The seal between valve stem 138 and gate aperture 160 cooperates with the tight fit between flat end surface 164 and mold cavity insert 140 to prevent molding material from flowing out of mold cavity 114.

Injection molding machine 100 is held in its closed position and valve stem 138 is held in its extended position while molding material in cavity 114 is cooled. After cooling is complete, injection molding machine 100 may be removed, and the newly-molded part may be removed from cavity 114. Injection molding machine 100 may then be returned to the closed state to begin a new molding cycle.

During operation of injection molding machine 100, hot runner 106 and the components thereof are heated to an elevated temperature, referred to as the process temperature, for maintaining the molten state of the molding material. Conversely, mold 108 and its components typically are actively cooled, to promote cooling and setting of molding material after injection into a mold. It therefore may be desired to maintain nozzle 128 at a high temperature, and mold cavity plate 110 and cavity insert 140 at a low temperature. Conveniently, gate pad insert 146 may provide some thermal insulation between nozzle 128 and cavity plate 110 and cavity insert 140.

As will be apparent, repetitive motion of valve stem 138 between its extended and retracted positions may cause valve stem 138 to rub against nozzle tip 132 and gate pad insert 146, which may cause wearing of valve stem 138, nozzle outlet 136 or gate aperture 160.

Conveniently, installation of gate pad insert 146 brings valve stem 138 into more precise alignment with gate aperture 160 by more precisely aligning nozzle tip 132 in passage 152. This may limit rubbing of valve stem 138 against gate pad insert 146, which may in turn limit wearing of valve stem 138 or gate aperture 160.

Moreover, since valve stem 138 forms a seal with gate aperture 160, inlet 142 of cavity 114 need not seal with valve stem 138 and thus may be dimensioned so that it is slightly larger than valve stem 138. This may provide clearance which may limit or eliminate rubbing between valve stem 138 and cavity insert 140.

Figure 3:
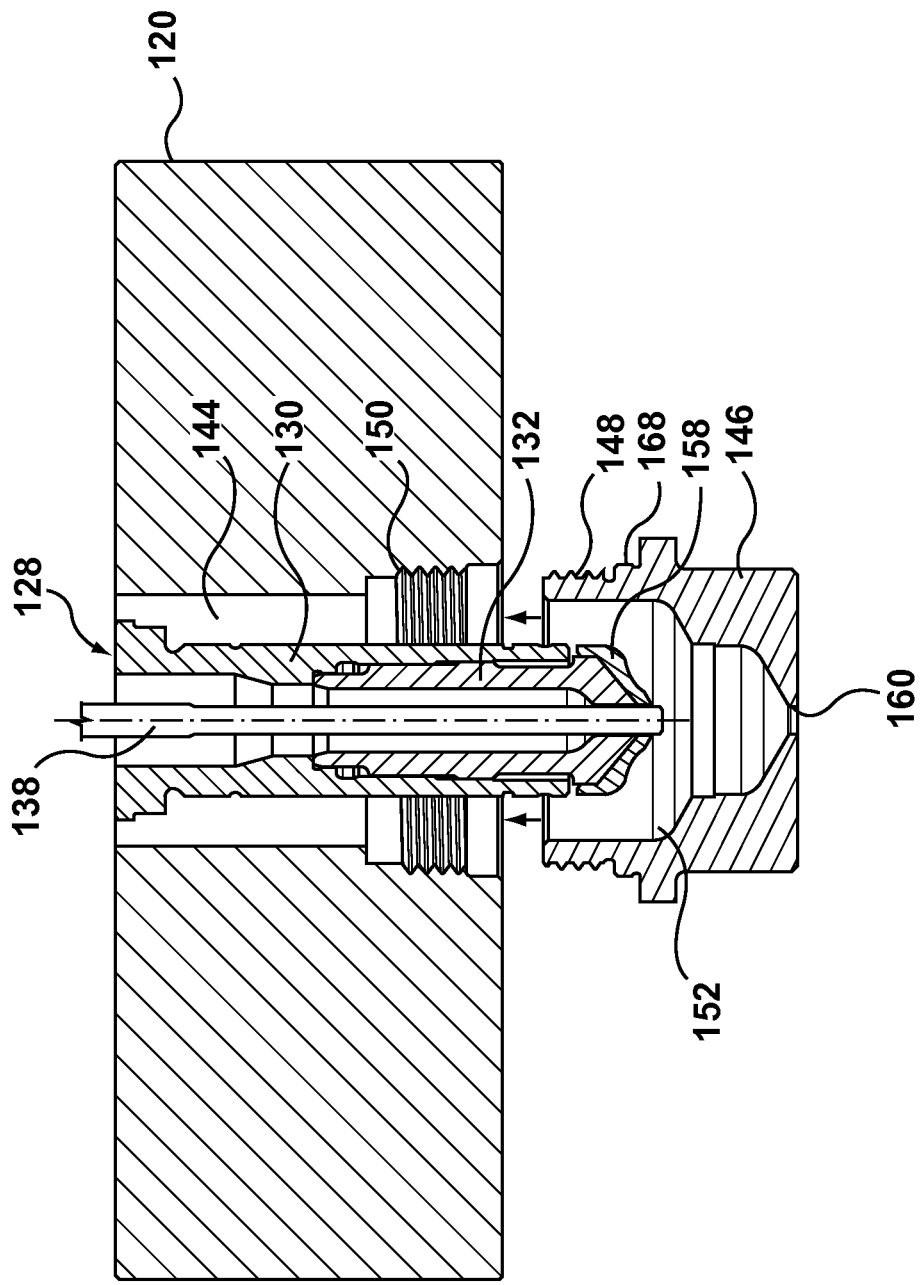
FIG. 3 is an enlarged cross-sectional view of another sub-assembly of the injection molding machine of FIG. 1.

If wear occurs, hot runner 106 or mold 108 of injection molding machine 100 may be disassembled and reassembled to replace gate pad insert 146 or cavity insert 140. Alternatively or additionally, hot runner 106 and mold 108 may be removed from stationary platen 102 and movable platen 104 to install a replacement hot runner 106 and mold 108 or to perform maintenance. To that end, FIGS. 3-4 depict intermediate states of assembly of hot runner 106 and mold 108.

Hot runner 106 is assembled by mounting backing plate 118 to stationary platen 102, and mounting manifold 124 to backing plate 118 (see FIG. 1). Nozzles 128 may be mounted to manifold 124 and manifold plate 120 may be mounted to backing plate 118. As noted above, components may be secured to one another using bolts or other suitable fasteners. Alignment pins 101 fixed to backing plate 118 are received in corresponding bores (not shown) in manifold plate 120 to ensure correct location of manifold plate 120 relative to backing plate 110.

Each gate pad insert 146 may be attached to manifold plate 120. One gate pad insert 146 is attached at the end of each passage 144 and receives the end of one nozzle 128. As depicted in FIG. 3, gate pad insert 146 is attached to manifold plate 120 by advancing threads 148 of inlet end 147 along corresponding threads 150 in manifold plate 120 proximate the end of passage 144. As inlet end 147 of gate pad insert 146 advances into manifold plate 120, the end of nozzle 128 is received in internal passage 152 of gate pad insert 146. If nozzle 128 is misaligned prior to gate pad insert 146 being threaded, the complementary tapered shapes of internal passage 152 and nozzle tip 132 cooperate to center nozzle 128 within gate pad insert 146 by aligning nozzle 128 in gate pad insert recess 152. Thus, once gate pad insert 146 is fully threaded into manifold plate 120, valve stem 138 is aligned with gate aperture 160. Simultaneously, shoulder 168 is received in its corresponding notch in passage 144, centering and squaring gate pad insert 146.

Figure 4:
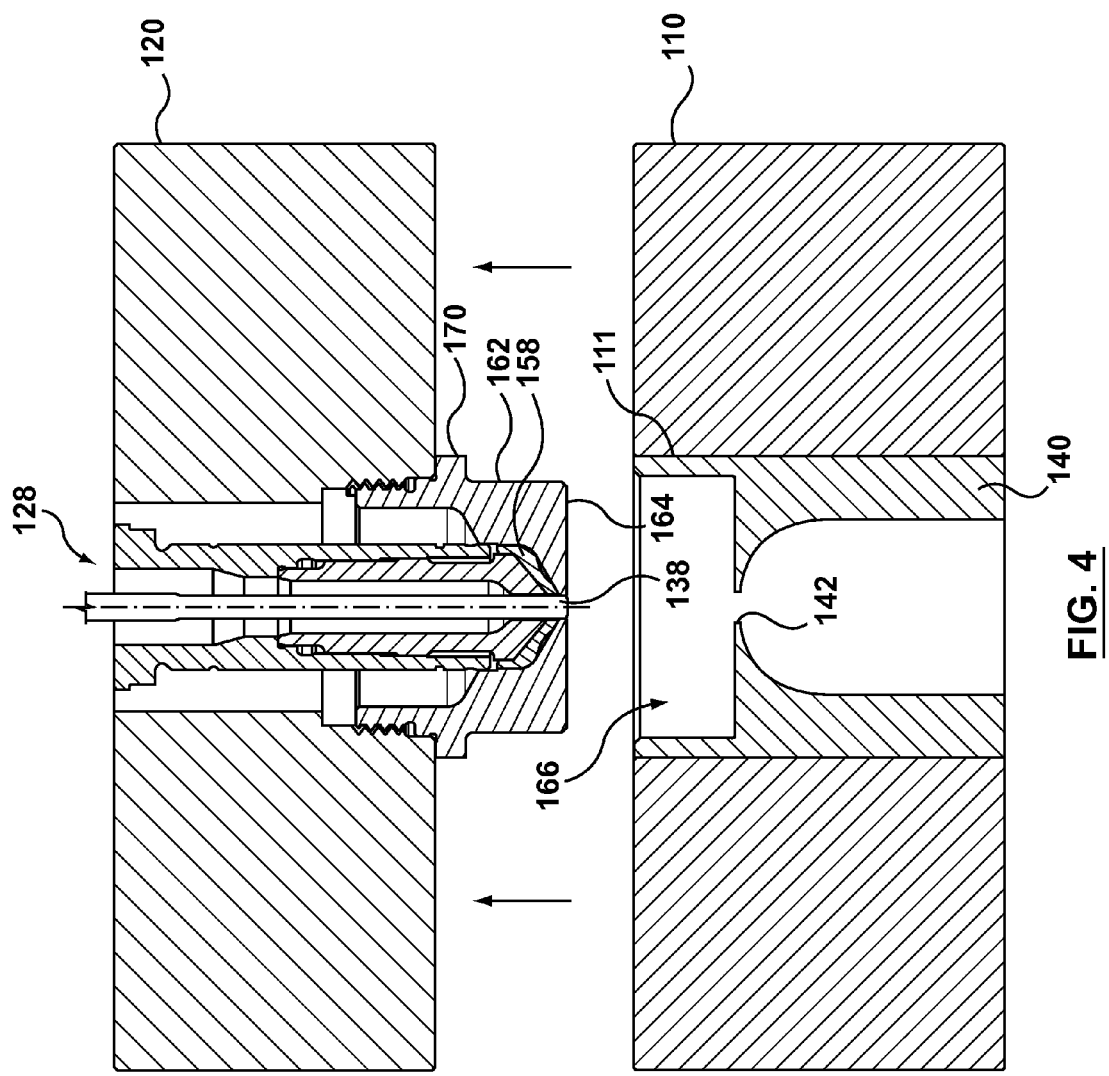
FIG. 4 is an enlarged cross-sectional view of another sub-assembly of the injection molding machine of FIG. 1.

As shown in FIG. 4, cavity insert 140 is installed into a bore 111 in cavity plate 110 and cavity plate 110 is mounted to manifold plate 120. Cavity insert 140 is slid into cavity plate 110 and held in cavity plate 110, for example by using a washer and screw. Alignment pins 101 may be received in corresponding bores 103 in cavity plate 110 to ensure correct location of cavity plate 110 relative to manifold plate 120.

Alignment of cavity plate 110 with manifold plate 120 likewise aligns cavity insert 140 with gate pad insert 146, since the latter is aligned with manifold plate 120 by shoulder 168.

As cavity plate 110 is secured to manifold plate 120, outlet end 149 of gate pad insert 146 is received in recess 166 of cavity insert 140. As noted above, end surface 164 of gate pad insert 146 tightly abuts mold cavity insert 140, and some clearance exists between lateral surface 162 of gate pad insert 146 and cavity inset 140. Due to the clearance between lateral surface 162 of gate pad insert 146 and cavity insert 140, some misalignment may occur between manifold plate 120 and cavity plate 110 without lateral surface 162 of gate pad insert 146 rubbing against cavity insert 140.

If misalignment occurs during assembly, chamfered corners 172 of gate insert pad 146 and cavity insert 140 may help to guide outlet end 149 of gate pad insert 146 into recess 166. Specifically, chamfered corners 172 may slide against one another to help guide gate pad insert 146 into recess 166 of cavity insert 140. Once cavity plate 110 is installed and gate pad insert 146 is received in recess 166 of cavity insert 140, nozzle outlet 136, valve stem 138 and gate aperture 160 align with inlet 142 of cavity insert, to provide fluid communication between aperture 160 and inlet 142.

The core side of mold 108 is assembled by mounting mold core plate 112 to movable platen 104 and closing injection molding machine 100 (see FIG. 1). Alignment pins 101 are received in bores 103 in mold core plate 112 to maintain correct positioning of mold core plate 112 relative to cavity plate 110 and manifold plate 120.

To replace or repair components, hot runner 106 may be partially or fully disassembled.

To repair or replace gate pad insert 146, injection molding machine 100 is opened and cavity plate 110 is removed. Gate pad insert 146 may then be removed and replaced or repaired. Specifically, gate pad insert 146 may be removed by detaching its retention device, namely, backing threads 148 off from threads 150.

Conveniently, gate pad insert 146 does not form any part of mold cavity 114. That is, molding surface 141 is defined entirely by cavity insert 140. As such, fabrication of gate pad insert 146 may require relatively little custom machining and gate pad insert 146 may be produced relatively quickly and inexpensively compared to cavity insert 140. Moreover, gate pad insert 146 may be replaced or repaired without removing cavity insert 140 from cavity plate 110.

Gate pad insert 146 may reduce or prevent contact between valve stem 138 and cavity insert 140 and therefore may reduce or prevent wear of cavity insert 140. Cavity insert 140 is typically custom-machined to define molding surface 141. Accordingly, replacement of cavity insert 140 may be relatively expensive and long lead times may be required to perform custom machining. Thus, avoiding a need to replace cavity insert 140 may represent significant cost savings.

Nevertheless, it may periodically be desired to replace or perform maintenance on cavity insert 140 or to replace cavity plate 110 and cavity insert 140 with another cavity plate and insert. To do so, injection molding machine 100 may be stopped in its open position, with valve stem 138 in its extended position and sealing gate aperture 160. Cavity plate 110 may then be removed. Cavity insert 140 may then be removed from cavity plate 110 and repaired or replaced, or another cavity plate with another cavity insert may be installed. Conveniently, it may be possible to perform such maintenance or replacement of cavity insert 140 without breaking the seal between valve stem 138 and gate aperture 160. Accordingly, as will be appreciated by skilled persons, it may also be possible to maintain plasticizing unit 116 in its operating state. That is, molding material within plasticizing unit 116, manifold 124 and nozzle 128 may be maintained in its molten state, at a molding process temperature, without being evacuated from injection molding machine 100. This may reduce the length of time for which molding operation of injection molding machine 100 is stopped in order to repair or replace mold components.

As depicted in FIGS. 2A-2B and 3-4, inlet end 147 of gate pad insert 146 includes threads 148 which serve as a retention element to removably attach the gate pad insert to manifold plate 120. In other embodiments, gate pad inserts may have different retention elements.

Figure 5:
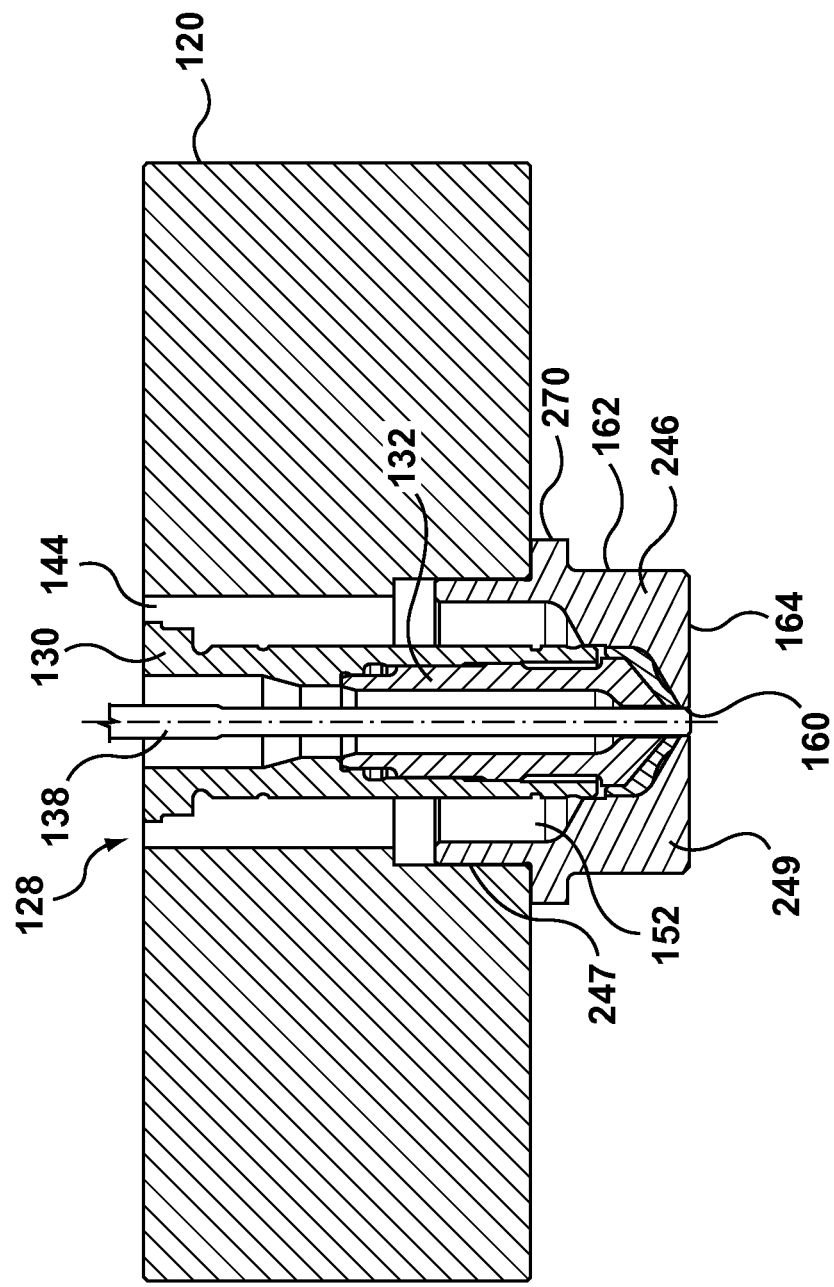
FIG. 5 is an enlarged cross-sectional view of an alternate sub-assembly of an injection molding machine.

FIG. 5 depicts one such gate pad insert 246, attached to a manifold plate 220. Gate pad insert 246 and manifold plate 220 are similar to gate pad insert 146 and manifold plate 120, with like features being indicated with like numerals.

Gate pad insert 246 includes a body with an inlet end 247 and an outlet end 249. Inlet end 247 is slightly wider than passage 244 of manifold plate 220 so that inlet end 247 and passage 244 form an interference fit. In an example, inlet end 247 may be approximately 5-10 microns wider than passage 244. Inlet end 247 is pressed into passage 244 and is removably retained therein. Thus, inlet end 247 serves as a retention member to removably attach gate pad insert 246 to manifold plate 220. Due to the interference fit between inlet end 247 and passage 244, pressing inlet end 247 into passage 244 also centers gate pad insert 246 relative to passage 244. Gate pad insert 246 a flange 270 that abuts manifold plate 220 when gate pad insert 246 is attached thereto. Flange 270 may be annular, for example, if gate pad insert 246 is circular in cross-section. Flange 270 limits the distance inlet end 247 can be inserted into passage 244 and holds gate pad insert 246 square to manifold plate 220.

Figure 6:
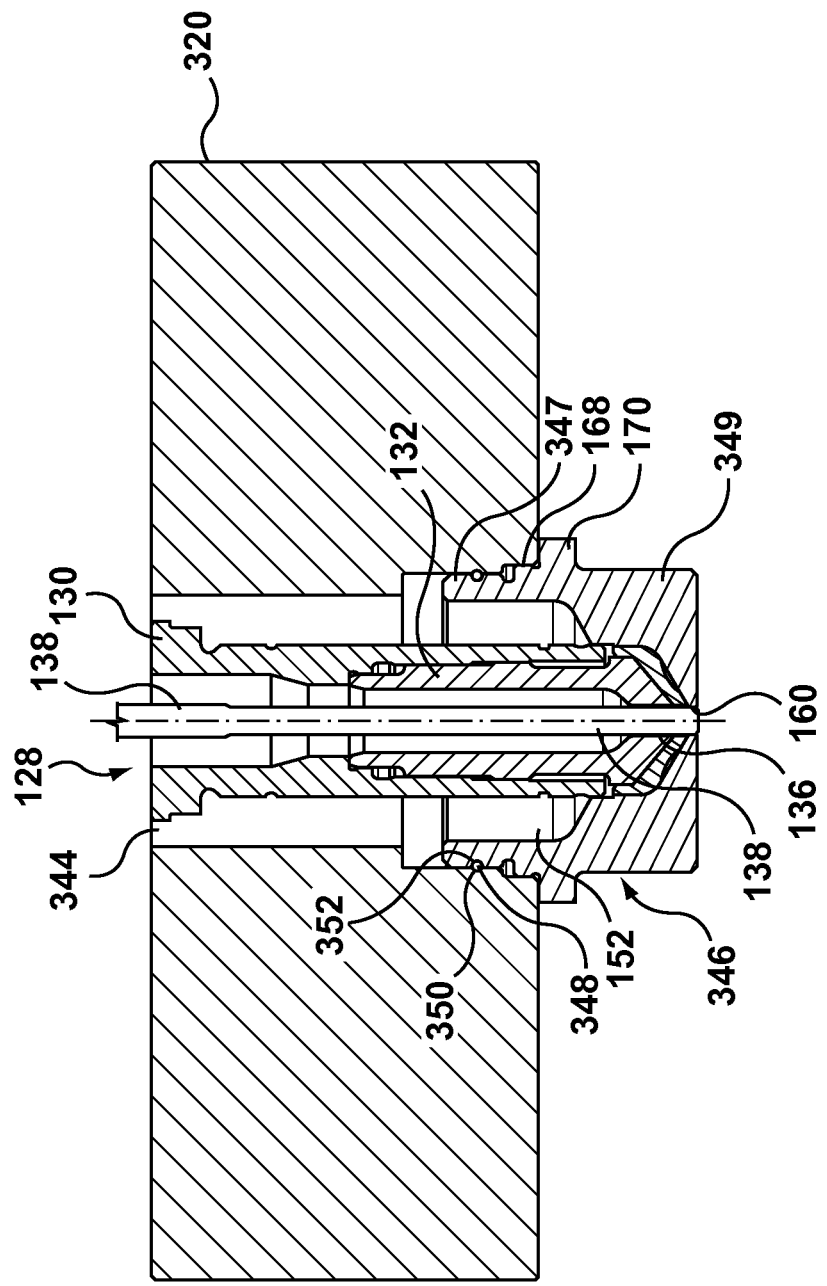
FIG. 6 is an enlarged cross-sectional view of an alternate sub-assembly of an injection molding machine.

FIG. 6 depicts another gate pad insert 346, attached to a manifold plate 320. Gate pad insert 346 and manifold plate 320 are similar to gate pad insert 146 and manifold plate 120, with like features being indicated with like numerals.

Gate pad insert 346 includes a body with an inlet end 347 and an outlet end 349. Inlet end 347 has an annular notch 352 in which a lock ring 348 is retained. Manifold plate 320 has a corresponding annular notch 350 defined in the wall of passage 344. Inlet end 347 may be inserted into passage 344 so that lock ring 348 is received in notch 350. Lock ring 348 then attaches gate pad insert 346 to manifold plate 320. Gate pad insert 346 may be removed by applying force to gate pad insert 346 sufficient to dislodge lock ring 348 from notch 350.

Figure 7:
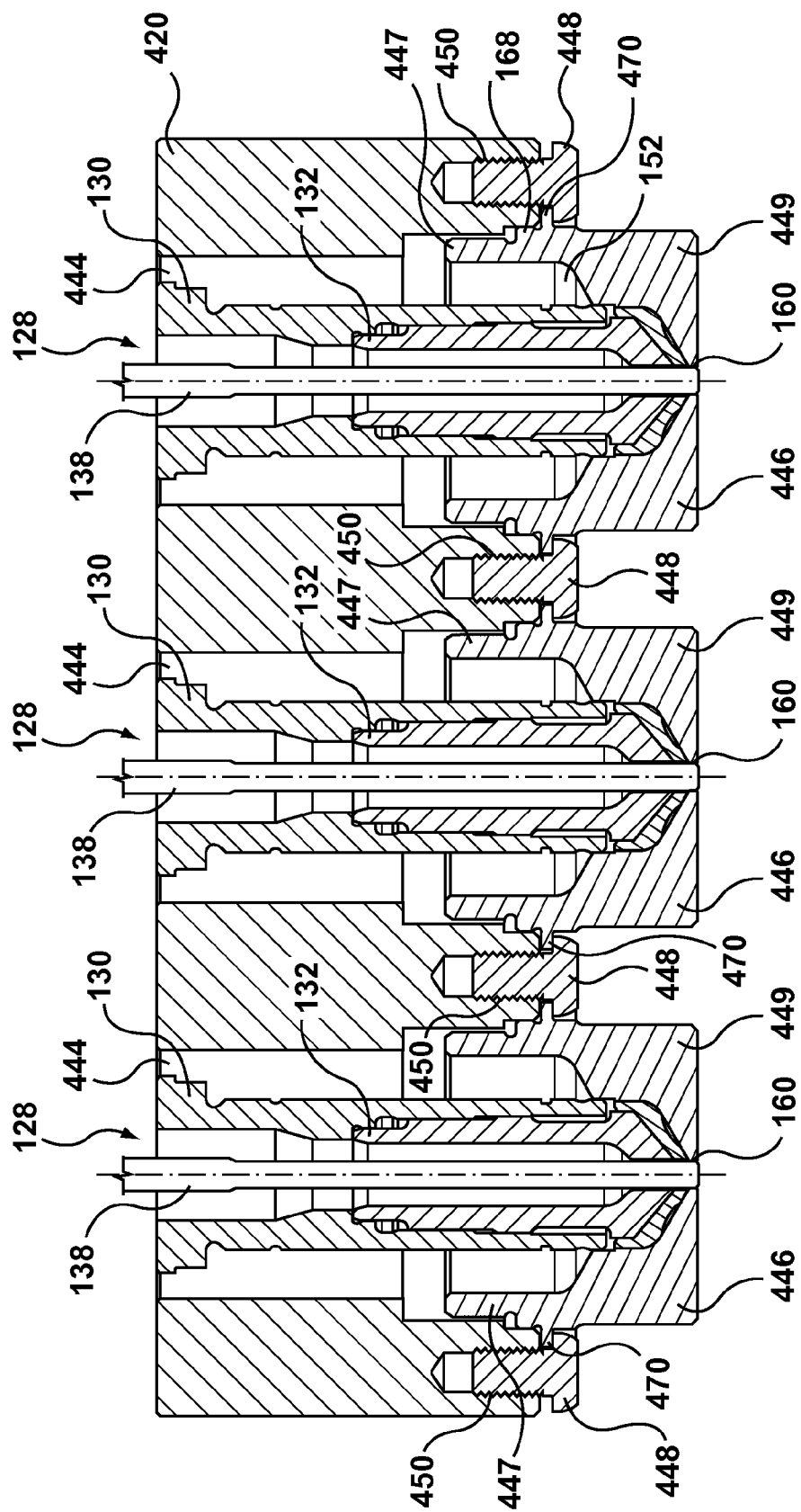
FIG. 7 is an enlarged cross-sectional view of an alternate sub-assembly of an injection molding machine.

FIG. 7 depicts three gate pad inserts 446 attached to a manifold plate 420. Each gate pad insert has an inlet end 447 and an outlet end 449. Each inlet end 447 is configured to be received within a corresponding passage 444 of manifold plate 420. Each outlet end 449 is configured to be received in a recess 166 of a cavity insert 140 (FIG. 2A).

Each gate pad insert 446 has a flange 470 protruding outwardly. Flanges 470 abut manifold plate 420. A series of bolts 448 serve as retention elements to removably attach gate pad inserts 446 to manifold plate 420. Specifically, each bolt 448 is received in a corresponding bore 450 in manifold plate 420. The head of each bolt can overlie flanges 470 of two adjacent gate pad inserts 446 and, when tightened against manifold plate 420, squeezes flanges 470 against manifold plate 420 to attach gate pad inserts.

As depicted, gate pad inserts 146/246/346/446 are cylindrical, as is the corresponding recess 152 in mold cavity insert 140. However, in other embodiments, gate pad inserts may have other geometries. For example, a gate pad insert may be conical or frustoconical, tapering toward the gate aperture. The mold cavity insert would be configured to define a mating recess. Other gate pad geometries are possible. Suitable gate pad shapes which permit gate pads to be matingly received in a corresponding recess in the mold cavity insert, and which allow the gate aperture and mold cavity inlet to be aligned will be apparent to those skilled in the art.

Of course, the above described embodiments are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A hot runner assembly for delivering molding material to a mold cavity of an injection molding machine, the mold cavity defined by a mold cavity insert, through a mold inlet defined in the mold cavity insert, comprising:
    a manifold plate;
    a nozzle extending through said manifold plate, said nozzle having a nozzle outlet;
    a gate pad insert having an inlet end with an inlet opening and an outlet end with a gate aperture and a passage through said gate pad insert from said inlet opening to said gate aperture, said gate pad insert removably attached to said manifold plate and removable from the mold cavity insert so that said nozzle is received in said passage and said nozzle outlet is in communication with said mold inlet through said gate aperture;
    a valve stem extending within said nozzle, movable between an extended position, in which said valve stem seals said gate aperture to prevent flow of molding material therethrough, and a retracted position.

2. The hot runner assembly of claim 1, wherein said nozzle extends through a passage in said manifold plate and said inlet end of said gate pad insert is received in said passage.

3. The hot runner assembly of claim 2, wherein said inlet end comprises threads and said threads engage corresponding threads in said manifold plate to removably attach said gate pad insert to said manifold plate.

4. The hot runner assembly of claim 2, wherein said inlet end forms an interference fit with said passage to removably attach said gate pad insert to said manifold plate.

5. The hot runner assembly of claim 2, further comprising a bolt received in said manifold plate to removably attach said gate pad insert to said manifold plate.

6. The hot runner assembly of claim 2, wherein said outlet end is received in a recess defined in said mold cavity insert.

7. The hot runner assembly of claim 6, wherein said gate pad insert has a flat end surface for sealingly engaging the mold cavity insert.

8. The hot runner assembly of claim 6, wherein the width of said outlet end is less than the width of said recess to provide clearance between said outlet end and said recess.

9. The hot runner assembly of claim 6, wherein said valve stem is movable between said extended and retracted positions without contacting said mold cavity insert.

10. The hot runner assembly of claim 1, wherein said gate pad insert has an external annular flange abutting said manifold plate to maintain said gate pad in a square orientation relative to said manifold plate.

11. A gate pad insert for an injection molding machine comprising a manifold plate, a nozzle extending through said manifold plate and a valve stem extending within said nozzle movable between an extended position in which said valve stem extends through an outlet of said nozzle and a retracted position, said gate pad insert comprising:
    a body having an inlet end with an inlet opening and an outlet end with a gate aperture, and a passage through said body from said inlet opening to said gate aperture;
    said inlet end removably attachable to said manifold plate so that said nozzle is received in said passage through said inlet opening and said outlet of said nozzle is in communication with said gate aperture, wherein said valve stem seals said gate aperture in said extended position, wherein said outlet end is configured to be received in a recess defined in a mold cavity insert of said injection molding machine, the mold cavity insert defining said mold cavity, wherein said gate aperture fluidly connects to an inlet in the mold cavity insert, and wherein said gate pad insert is removable from the mold cavity insert.

12. The gate pad insert of claim 11, wherein said gate pad is removably attachable to said manifold plate by inserting said inlet end of said gate pad insert in a passage defined through said manifold plate.

13. The gate pad insert of claim 12, wherein said inlet end comprises threads and said gate paid is removably attachable to said manifold plate by engaging said threads with corresponding threads in said manifold plate.

14. The gate pad insert of claim 13, wherein said inlet end is sized to form an interference fit with said passage.

15. The gate pad insert of claim 13, wherein the width of said outlet end is less than the width of said recess to provide clearance between said outlet end and said recess.

16. The gate pad insert of claim 15, wherein said valve stem is movable between said extended and retracted positions without contacting said mold.

17. The gate pad insert of claim 12, further comprising an external annular flange configured to abut said manifold plate to maintain said gate pad in a square orientation relative to said manifold plate.

18. A system for delivering molding material to a mold cavity of an injection molding machine, comprising:
    a manifold plate;

a mold cavity insert defining the mold cavity, the mold cavity insert having a mold inlet leading to the mold cavity;

a nozzle extending through said manifold plate, said nozzle having a nozzle outlet;

a gate pad insert having an inlet end with an inlet opening and an outlet end with a gate aperture and a passage through said gate pad insert from said inlet opening to said gate aperture, said gate pad insert removably attached to said manifold plate and removable from the mold cavity insert so that said nozzle is received in said passage and said nozzle outlet is in communication with said mold inlet through said gate aperture; and a valve stem extending within said nozzle, movable between an extended position, in which said valve stem seals said gate aperture to prevent flow of molding material therethrough, and a retracted position.

\* \* \* \* \*